United States Patent [19]

Chiba et al.

[11] 4,353,605

[45] Oct. 12, 1982

[54] ROLLER BEARING OF THE TYPE HAVING A SEALING RING CAPABLE OF FORCIBLY CIRCULATING LUBRICANT

[75] Inventors: Moichi Chiba, Yokosuka; Toshio Suzuki, Chigasaki, both of Japan

[73] Assignee: Nippon Seiko Kabushiki Kaisha, Tokyo, Japan

[21] Appl. No.: 183,322

[22] Filed: Sep. 2, 1980

[30] Foreign Application Priority Data

Sep. 3, 1979 [JP] Japan .................. 54-121571[U]

[51] Int. Cl.³ .................. F16C 33/78; F16C 19/26
[52] U.S. Cl. .................. 308/187.2; 308/212; 308/217; 277/83
[58] Field of Search .................. 308/187.1, 187.2, 36.4, 308/36.5, 217, 215, 212, 213; 277/95, 173–177, 83, 94

[56] References Cited

U.S. PATENT DOCUMENTS

| 3,404,926 | 10/1968 | Horne | 308/187.2 |
|---|---|---|---|
| 3,423,140 | 1/1969 | Cowles | 308/187.2 |
| 3,447,848 | 6/1969 | Pitner | 308/187.2 |
| 3,458,207 | 7/1969 | Conti | 277/83 |
| 3,479,100 | 11/1969 | Pitner | 308/187.2 |
| 3,510,182 | 5/1970 | Cowles | 277/95 X |
| 3,601,457 | 8/1971 | Helms | 308/187.2 |
| 3,906,746 | 9/1975 | Haines | 308/187.2 X |
| 3,924,912 | 12/1975 | Pitner | 308/212 |
| 4,162,110 | 7/1979 | Gardella | 308/187.2 X |

FOREIGN PATENT DOCUMENTS 1162646  2/1964  Fed. Rep. of Germany ... 308/187.2

*Primary Examiner*—Richard R. Stearns
*Attorney, Agent, or Firm*—Basile, Weintraub & Hanlon

[57] ABSTRACT

In a roller bearing comprising an outer ring which has an inwardly bent annular flange, a sealing ring is loosely interposed between the inner circumference of the flange and a shaft with a suitable clearance. An element for imparting a forced rotation to the sealing ring is, also, provided on either one or both of the sealing ring, cage, or the flange of the outer ring to drive the sealing ring by the rotation of the roller, cage or the flange of the outer ring. By virtue of this construction lubricant can be forcibly circulated through the sealing ring between and throughout the interior and exterior of the roller bearing.

15 Claims, 4 Drawing Figures

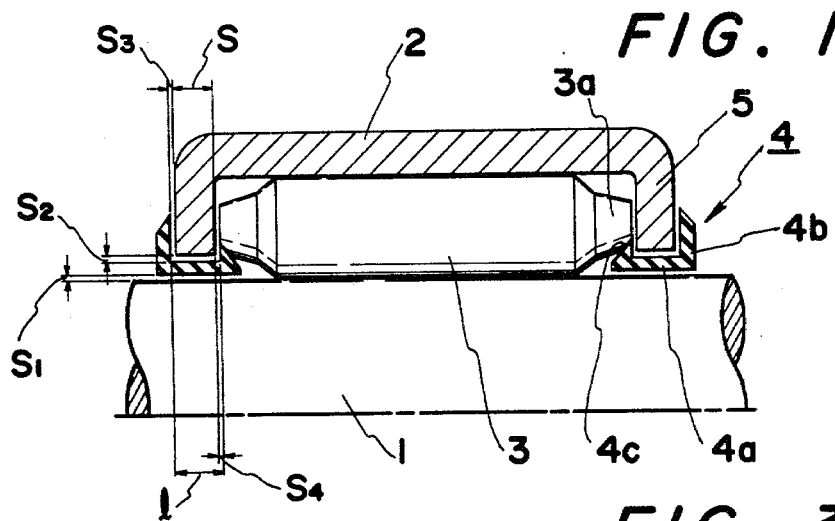
FIG. 1
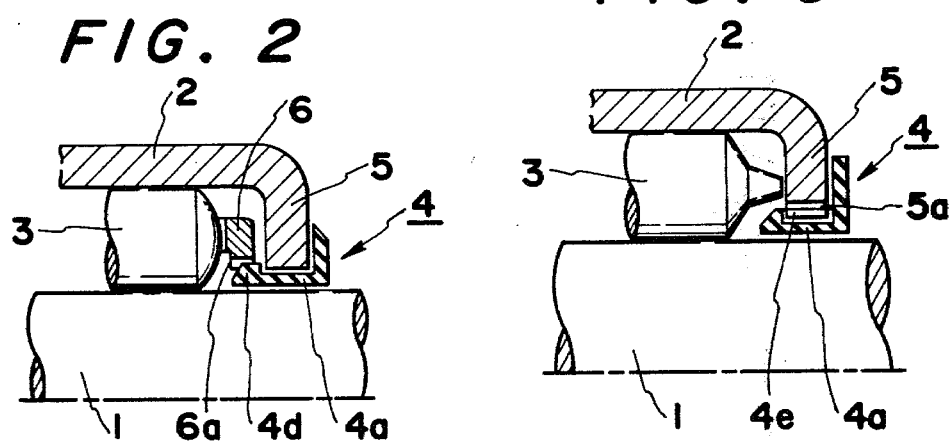
FIG. 2
FIG. 3
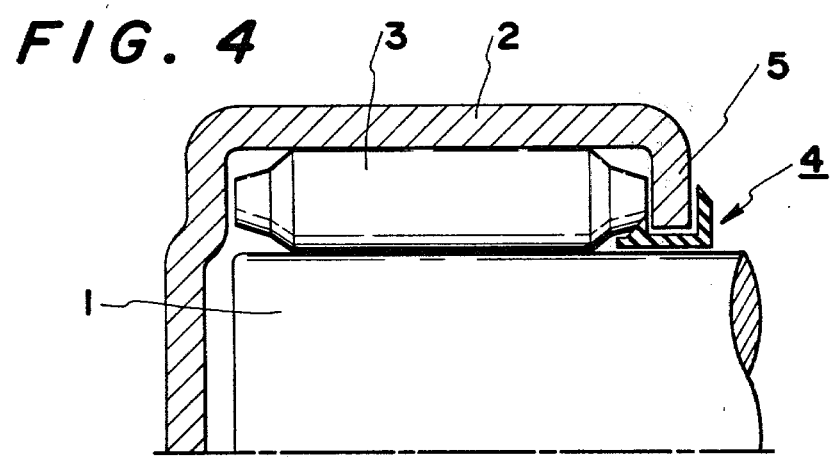
FIG. 4

ROLLER BEARING OF THE TYPE HAVING A SEALING RING CAPABLE OF FORCIBLY CIRCULATING LUBRICANT

BACKGROUND OF THE INVENTION

I. Field of the Invention

This invention relates to a roller bearing which comprises at least one sealing ring disposed with respect to an outer ring, and wherein the sealing ring is capable of forcing circulation of lubricant or lubricating oil.

II. Description of the Prior Art

Generally, a sealing ring which is used as a sealing means for roller bearings which have an outer ring having at least a radially and inwardly directed flange, such as needle roller bearings, long cylindrical roller bearings and cylindrical roller bearings, is fixedly attached to the outer ring and constitutes a contiguous or noncontiguous sealing portion.

Accordingly, there are encountered problems such as the requirement for special work and/or troublesome handling in assembling the sealing member to the outer ring.

In view of these drawbacks, the present inventor has previously developed a sealing structure attached with a sealing ring or rings which enables elimination of special work, as well as facilitating assembly of the sealing ring.

The prior invention contemplates forming a recessed groove or grooves on a radially outer circumference of the sealing ring to constitute a region of labyrinth sealing between at least a part or the entire flange of the outer ring and the sealing ring. The inner circumference of the sealing ring is fixedly attached to the shaft and the sealing ring is integrally assembled to the flange of the outer ring. This sealing structure is believed to be the most similar invention filed prior to the present invention.

As noted, this prior development comtemplates a labyrinth sealing region between the flange of the outer ring and the sealing ring to thereby prevent invasion of foreign matter or particles from outside of the bearing. However, such a bearing is not wholly satisfactory for avoiding the problems caused by the foreign matters, such as iron dust particles entrapped in lubricating oil, when this type of bearing is received in a case containing lubricating oil and lubrication of the bearing is performed by the lubricating oil surrounding the bearing. The present invention has been accomplished to eliminate the drawbacks encountered in the sealing structure of the inventor's prior invention.

OBJECTS OF THE INVENTION

Accordingly, an object of the present invention is to provide a roller bearing of the type having a flanged outer ring and which further comprises a sealing member(s) forcibly rotated by either the roller, the cage or the outer ring.

Another object of this invention is to provide a roller bearing having a flanged outer ring wherein the sealing member or ring effects forced lubrication.

A further object of the present invention is to prolong the service life of the bearing by expelling foreign matter from the interior of the bearing and to suppress a temperature rise of the bearing during its running.

A still further object of the invention is to accomplish the above-mentioned objects by a sealing member of simplified structure which can be readily assembled into a bearing body and onto a shaft and is, also, free from any undesirable damage or escape therefrom during assembly.

SUMMARY OF THE INVENTION

The sealing member or sealing ring of this invention, which is used for a roller bearing having an outer ring having a flange(s), is rotated by using either one of the rollers, the cage or the flange of an outer roller for imparting force rotation to the sealing ring.

The manner by which forced rotation is imparted to the sealing ring is provided through portions or elements solely on the sealing ring, itself, or on the member for imparting forced rotation, or on both of them. Imparting forced rotation is achieved by using either one of the following: (a) means or elements which act to contact the sealing ring with the roller; (b) means or elements which act to engage the sealing ring with the cage or integrally with the flange, or (c) means or elements which act to contact either the sealing ring and the cage or the sealing ring and the flange of the outer ring. Alternatively, combinations of the above-mentioned, various means or elements can be used.

Because of the structural features of the present roller bearing, circulation of a lubricant between the interior and the exterior of the bearing can be forcibly performed by the rotation of the sealing body. Thereby foreign matter in the interior, such as iron dust particles, can be expelled out of the bearing and fresh lubricant can be supplemented into the bearing.

Consequently, undesirable remaining lubricant within the bearing, which gives rise to degradation thereof, can be fully avoided, and at the same time, temperature rise in the bearing is greatly suppressed, which in turn greatly prolongs the service life of the bearing.

Also, by virtue of the simplified structure, assembly of the sealing ring to a bearing and further setting of the assembled bearing to a shaft becomes very easy.

Moreover, the bearing of the present invention can be used for a longer period of service because there is no damage to or escape of the sealing ring during the assembly or attaching operation.

In addition, as the sealing ring of this invention is of the non-contiguous type, it is especially effective for use as a bearing for receiving a shaft which is subjected to high rotational speed under low torque.

For a more complete understanding of the present invention, explanation will be made by referring to the following detailed description and accompanying drawings. In the drawings like reference characters refer to like parts throughout the several drawings:

BRIEF DESCRIPTION OF THE DRAWINGS

FIG. 1 is a side elevational view, partly in section, which shows an embodiment in which at least one of the bearing rollers is used as a transmission member for imparting forced rotation to a sealing ring or rings contacted therewith;

FIG. 2 is a side elevational view, partly in section, which shows another embodiment of the present invention which uses at least one of the bearing cages as a transmission member for imparting forced rotation to the sealing ring or rings;

FIG. 3 is another side elevation view, partly in section, which shows another embodiment in which at least one of the flange portions of an outer ring is used as a transmission member for imparting forced rotation to a sealing ring which contacts with the flange; and FIG. 4 is a side elevational view, partly in section, showing a roller bearing having an outer ring provided with an annular flange only at one axial end portion thereof.

DETAILED DESCRIPTION OF THE PREFERRED EMBODIMENTS

Referring now to the drawings, FIG. 1 illustrates an embodiment wherein at leastg one roller is used as a transmitter or transmission means for imparting forced rotation to a mating sealing ring(s). The assembly of FIG. 1 comprises a shaft 1, a shell-shaped outer ring 2, a needle roller 3 and a sealing ring 4 fabricated of rubber or other synthetic resinous elastomer material.

The outer ring 2 has at each of its two axial ends a radially and inwardly directed flange 5. A sealing ring 4 is interposed between the flange 5 and the shaft 1. The sealing ring 4 includes a cylindrical portion 4a, the inner periphery of which has an inner diameter slightly larger than the outer diameter of the shaft 1. The outer circumference of the ring 4 has an outer diameter slightly smaller than the inner diameter of the flange 5. A flanged annular ring portion 4b extends radially and outwardly from the outer axial end portion of the cylindrical portion 4a.

A projection 4c is formed on the outer peripheral surface of the axially inner end portion of the cylindrical portion 4a of the sealing ring 4.

The axial length, l, between the opposing faces of the projection 4c and the annular flanged ring portion 4b is slightly larger than the wall thickness S of the flange 5. The length (height) of the projection 4 radially and outwardly extending from the circumference of the cylindrical portion is chosen to extend beyond the lower or inner peripheral end of a tapered and reduced diameter portion 3a provided at the axial end of the needle roller 3.

The circumferential length of the projection 4 is selected so that it may be placed between two adjacent needle rollers.

Either a single projection 4c is provided on a sealing ring 4 or a plurality of projections may be provided, as necessary.

The sealing ring 4, fabricated as mentioned above, can be attached by means of its elasticity to the flange 5 of the outer ring 2 wherein the outer periphery of the cylindrical portion 4a faces the inner periphery of the flange 5 of the outer ring, after the outer ring 2 and the needle roller 3 have been assembled together.

Alternatively, the roller 3 may be assembled to the shaft 1 after the sealing ring 4 has been made integral with the outer ring 2, by attaching it to the flange 5 of the outer ring 2.

The assembled and sealed bearing maintains a clearance S1 between the inner circumference of the sealing ring 4 and the outer circumference of the shaft 1 when the bearing receives the shaft 1.

The dimensions of the sealing ring 4 and the flange 5 are selected such that suitable clearances S2, S3 and S4 are maintained, respectively, between the outer circumference of the cylindrical portion 4a of the sealing ring and an inner circumference of the flange 5 of the outer rings, as well as between the axial outer end face of the flange and the opposed inner face of the annular ring portion 4b and between the axial inner face of the flange 5 and the opposing inner face of the projection 4c.

By virture of the projection 4c formed on the sealing ring 4, there arises no escape of the sealing ring 4 outside of the flange 5 of the outer ring 2.

In a full type roller bearing, i.e. one without any cage as shown in the FIG. 1, the periphery of the projection 4c of the sealing ring will eventually engage the reduced diameter portion 3a of any needle roller or rollers, so that no escape of the roller from the outer ring takes place.

The projection or projections 4c formed on the sealing ring 4 engage the reduced diameter portion 3a of the needle roller, when the needle roller 3 rotates around the shaft while being retained by the outer ring 2. Accordingly, the sealing ring 4 will, also, be rotated around the shaft because it is being forced by the rotation of the needle roller 3.

Moreover, as the projection 4c of the sealing ring 4 acts as a member for imparting forced rotational motion, only a single point projection formed in a sealing ring may achieve the function of imparting rotation.

As a special configuration of the sealing ring, an annular projection having a height lower than the inner marginal end of the reduced diameter portion 3a can be formed around the entire extent of the inner end of the cylindrical portion 4a, to define an annular groove between the annular ring 4b and the annular projection. A discrete projection or projections 4c may further be formed on the so-formed annular groove.

Where cylindrical rollers with no reduced diameter portions are used, in lieu of needle rollers having reduced diameter ends, the height of the projections 4c can be freely selected.

FIG. 2 shows another embodiment wherein a cage(6) is used as a member or element for imparting forced rotation to the sealing ring or rings. Where the structure of FIG. 2 is the same as that of FIG. 1 detailed explanation is omitted.

As shown in FIG. 2, a radial inner circumference of each cage 6, is cut away, partially or entirely, along the axial length of the inner circumference to form a recessed portion 6a.

A projection 4d having a height approximately the same as the radial length (depth) and a circumferential length about the same as that of the recessed portion 6a is provided on the radially outer circumference, at the axially inner end portion of the sealing ring 4. The recessed portion 6a and the projection 4d, as a couple, may be provided only at one portion or at a plurality of portions of the cage 6 and the sealing rings 4, respectively.

The sealing rings 4 having projections 4d are assembled to the cage 6 with the recessed portions 6a in the same manner as illustrated in the embodiment shown in the FIG. 1.

Turning both the ring and cage in a relatively reverse direction, after the sealing ring has been inserted between the shaft 1 and the flange 5 of the outer ring 2, with the cylindrical portion 4a of the sealing ring 4 being placed opposed to the inner circumference of the outer ring, places the projection 4d in position to be received in the recessed portion 6a, so that the two members are coupled together.

Also, in this manner, entirely the same relative relation as explained with respect to the embodiment of FIG. 1 can be kept between the sealing ring 4, and the shaft 1 and the flange 5 of the outer ring when the shaft 1 has been received by the bearing.

Thus, both the recessed portion 6a and the projection 4d comprise the means for imparting forced rotation to the sealing ring 4, whereby the rotation of the needle roller 3 around the shaft 1 accompanies the rotation of the cage 6, which further results in rotation of the sealing ring 4 following the rotation of the cage 6.

In this embodiment, it is apparent that a recessed portion can be provided in the sealing ring 4 and a projection on the cage 6.

As a modification of this embodiment, it is also possible to provide a projection or projections either on both the inner circumference of the cage and the outer circumference of the axially inner end portion of the cylindrical portion 4a of the sealing ring 4 or on any one of the two, and thereby rotate the sealing ring by abutting the projection formed on the cage 6 with the projection on the sealing ring.

Alternatively, any projection formed on either one of the two members is frictionally contacted with the surface of the other member, which has no projection.

FIG. 3 shows an embodiment of this invention applied to a bearing wherein the outer ring itself rotates about its axis, and in which the flange of the outer ring acts as a member for imparting forced rotation to the sealing ring of the bearing.

According to this embodiment, on the radially inner end of the flange 5 of the outer ring 2, a recessed portion or projection 5a is formed. A projection or recessed portion 4e, having almost equal length, both in circumferential and radial directions to those of the recessed portion or projection 5a, is formed on the radially outer circumference of the cylindrical portion 4a of the sealing ring. The recessed portion and projection may be provided solely at one point of each part as a couple or a plurality of these couples can be provided at a suitable spacing on their circumferences.

The sealing ring 4 provided with projection or recessed portion and the outer ring 2 having recessed portion or projection on the inner circumference of its flange 5, which comprise a couple can be assembled together by inserting the sealing ring 4 between the flange 5 and the shaft 1 with their projection and recessed portion opposed to each other.

Turning the assembled outer ring and sealing ring in a relatively reverse direction, will result in engagement of the projection or recessed portion 4e of the sealing ring 4 with the recessed portion or projection 5a of the flange 5 of the outer ring 2, thereby integrally assembling the sealing ring 4 and the outer ring 2.

A similar co-relation can be established as heretofore described when the shaft 1 is received by the bearing between the sealing ring 4, the shaft 1 and the flange 5 of the outer ring 2, except that the manner of engagement between the recessed portion and the projection between the two members is different from the embodiment of FIG. 1. Consequently, a recessed portion or projection provided on the flange 5 and the sealing ring 4, respectively, defines a means for imparting forced rotation as a couple. Thus, rotation of the outer ring 2 results in rotation of the sealing ring 4 following the outer ring 2.

In each of the embodiments as explained above which comprises a sealing ring which is forcibly rotated by either one of the rollers, the cages or the flanges of the outer ring, lubrication can be performed by a lubricant which has previously been sealed in the interior of the bearing, such as grease, or by a lubricating oil which is received in a container or case surrounding the bearing.

The bearing according to the present invention is particularly effective in supplying lubricant to the bearing by circulation of the lubricant surrounding the bearing.

As the sealing ring 4 is forcibly rotated by at least one of the roller 3, cage 6 or flange 5 of the outer ring, a clearance S1 is maintained between the shaft 1 and the projection 4c and clearances S2, S3 and S4 are, also, maintained between the sealing ring 4 and the inner circumference of the flange, as well as between the axial inner face of the flange 5 and the opposing face of the projection and between the axial outer face of the flange and the opposing face of the annular ring of the sealing ring, respectively. Accordingly, the annular ring portion 4b of the sealing ring 4, due to the rotation of the sealing ring 4, plays a role as an oil ejector to scatter the lubricating oil outwardly through the clearance S3 by centrifugal force. Also the lubricating oil in the interior of the bearing will be sucked away from the interior of the bearing, passing through the clearances S4 and S2 formed between the flange 5 and the sealing ring 4, and between the radial inner circumference of the flange 5 and the outer circumference of the sealing ring.

Lubricating oil outside the bearing, is sucked into the bearing interior through the clearance S1 formed between the sealing ring 4 and the shaft 1.

According to the present invention, forced circulation of the lubricating oil throughout the interior and exterior of the bearing can be accomplished by the sealing ring which displays the functions mentioned above.

In order to improve further the suction effect by the structure of this invention, it is also possible to make the inner circumference of the cylindrical portion 4a of the sealing ring 4 with a tapered cross section with respect to the circumference of the shaft 1.

The embodiments heretofore explained refer to roller bearings having an outer ring having two flanges one each at its both axial ends, however, it is also possible to similarly apply the concept of this invention to a kind of bearing outer ring of which has only a flange at its one axial end.

Naturally, the present invention can also be applied to bearings which comprise an inner ring.

We claim:

1. A roller bearing containing a lubricant therein which comprises:
   (a) an outer ring hving at least an annular flange at one axial end thereof, the flange extending in a radially inward direction;
   (b) a plurality of rollers housed in said outer ring for receiving a shaft;
   (c) at least a sealing ring interposed between the inner circumference of said flange and the outer circumference of the shaft, and wherein said sealing ring comprises:
   (1) a cylindrical portion having an axial length slightly larger than the thickness of said flange of said outer ring, an inside diameter slightly larger than the outside diameter of the shaft, and an outside diameter slightly smaller than the inside diameter of the flange of said outer ring such that the cylindrical portion can be loosely interposed between said flange and said shaft with predetermined clearances;

(2) a flanged annular ring portion extending radially outwardly from the outer axial end of said cylindrical portion and keeping a predetermined clearance with the outer surface of said flange of said outer ring; and (3) at least one projection having a radial height and circular directional width for laying on the inner surface of said flange so as to prevent the sealing ring from escaping outside of the said flange; and (d) means for imparting forced rotation to said sealing ring, and wherein the means for imparting forced rotation coacts with said sealing ring to impart the forced rotational force to said sealing ring such that a forced circulation of the lubricant is effected through said clearance by centrifugal scattering force generated along said surface of said flange annular portion when said sealing ring is driven by said means for imparting forced rotation.

2. A roller bearing as claimed in claim 1, wherein: the outer ring is of a shell shape and the roller is a needle roller having reduced diameter end portions and the means for imparting forced rotation is disposed on said sealing ring and includes a projection provided on the inner circumference at the inner axial end of said cylindrical portion which protrudes radially and outwardly passing over the inner peripheral end of the reduced diameter end portion of said needle roller.

3. A roller bearing as claimed in claim 1, wherein: the roller bearing further comprises a cage; and the means for imparting forced rotation to the sealing ring comprises a projection disposed on the inner circumference of said cage and a recessed portion disposed on the outer circumference at the inner axial end of said sealing ring engagable with said projection on said cage.

4. A roller bearing as claimed in claim 1, wherein: said roller bearing further comprises a cage; and the means for imparting forced rotation to the sealing ring comprises a recessed portion disposed on the inner circumference of said cage and a projection disposed on the outer circumference at the inner axial end of said sealing ring engagable with said recessed portion on said cage.

5. A roller bearing as claimed in claim 1, wherein: the means for imparting forced rotation to the sealing ring comprises a recessed portion disposed on the inner circumference of the flange of the outer ring and a projection disposed on the outer circumference at the inner axial end of said sealing ring engagable with said recessed portion on said flange.

6. A roller bearing as claimed in claim 1, wherein: the means for imparting a forced rotation to the sealing ring comprises a projection disposed on the inner circumference of the flange of said outer ring and a recessed portion disposed on the outer circumference at the inner axial end of the sealing ring engagable with said projection on said flange.

7. A roller bearing as claimed in claim 1, wherein: the roller bearing includes a cage; and the means for imparting forced rotation to said sealing ring comprises at lest one projection disposed on both the inner circumference of said cage and the inner axial end of the cylindrical portion of said sealing ring.

8. A roller bearing as claimed in claim 1, wherein: the roller bearing includes a cage; and the means for imparting forced rotation to said sealing ring comprises at least one projection disposed on the inner circumference of said cage.

9. A roller bearing as claimed in claim 1, wherein: the roller bearing includes a cage; and the means for imparting forced rotation to said sealing ring comprises at least one projection disposed on the inner axial end of the cylindrical portion of said sealing ring.

10. A roller bearing as claimed in claim 1, wherein: the means for imparting forced rotation to the sealing ring comprises at least one projection disposed on both the inner circumference of the flange of the outer ring and the outer circumference of the cylindrical portion of said sealing ring.

11. A roller bearing as claimed in claim 1, wherein: the means for imparting forced rotation to the sealing ring comprises at least one projection disposed on the inner circumference of the flange of the outer ring.

12. A roller bearing as claimed in claim 1, wherein: the means for imparting forced rotation to the sealing ring comprises at least one projection disposed on the outer circumference of the cylindrical portion of the sealing ring.

13. The roller bearing of claim 1, wherein: the means for imparting forced rotation is disposed on the roller.

14. The roller bearing of claim 1, wherein: the means for imparting forced rotation is disposed on the sealing ring.

15. The roller bearing of claim 1 which further comprises:
a cage; and
wherein the means for imparting forced rotation is disposed on the cage.

* * * * *